Dec. 16, 1930. H. M. BRIGHAM 1,785,541
SPRING SCALE
Filed June 6, 1929
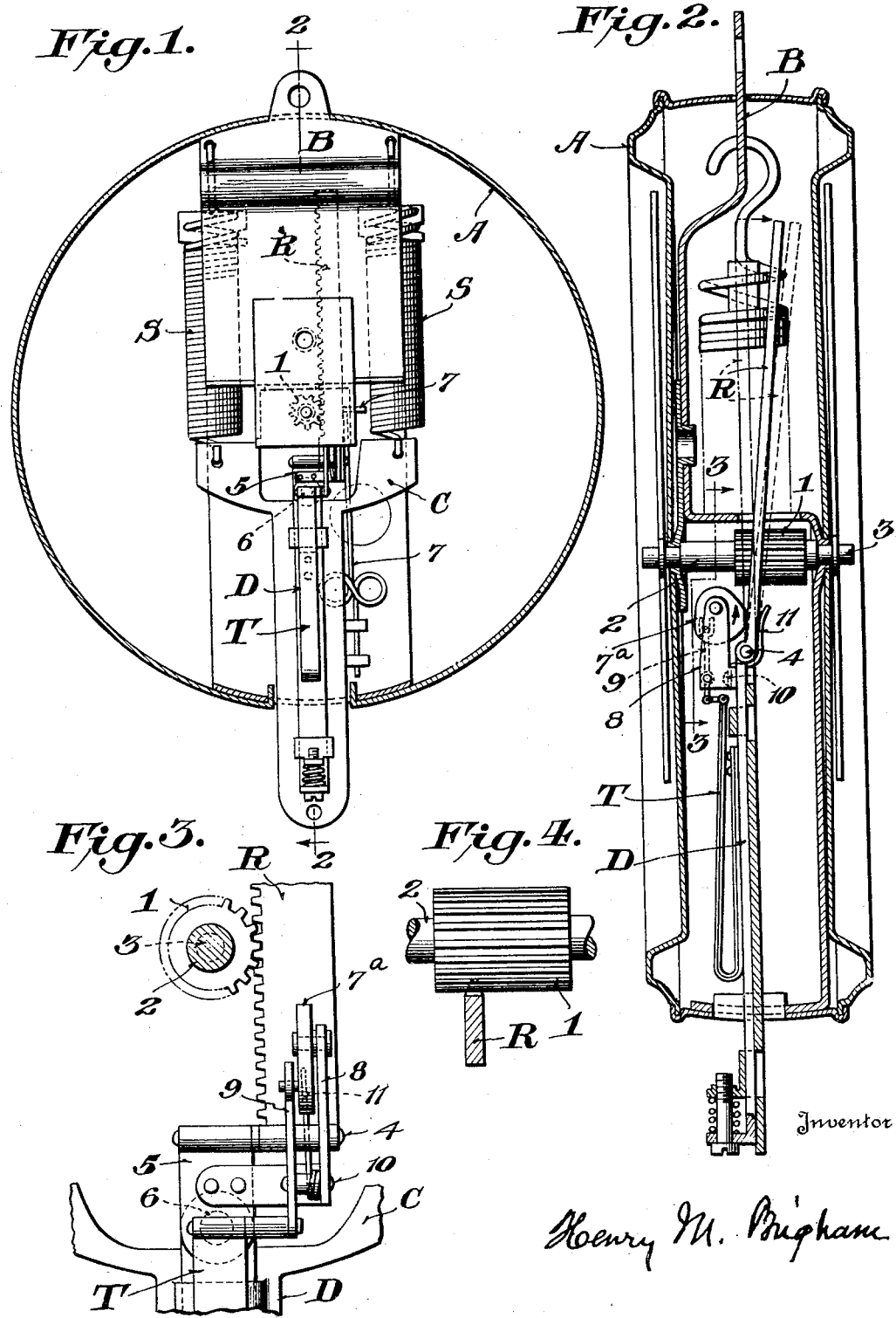

Patented Dec. 16, 1930

1,785,541

UNITED STATES PATENT OFFICE

HENRY M. BRIGHAM, OF BROOKLYN, NEW YORK, ASSIGNOR TO JOHN CHATILLON & SONS, OF NEW YORK, N. Y.

SPRING SCALE

Application filed June 6, 1929. Serial No. 368,858.

The present invention relates to spring scales of the type ordinarily known as spring balances, and has special reference to a novel and improved means for correcting the reading of the indicator at zero and to also compensate for the changes in stiffness of the springs due to changes in temperature.

A distinctive object of the invention is to provide means for moving the rack which engages with the indicator pinion in such a way that the relative angular position of the rack makes the necessary correction for the two errors commonly found in spring scales above referred to. Heretofore, it has been the customary practice to only mount the rack on a hinged axis or support lying in a plane parallel with the axis of the indicator pinion or indicator shaft, but according to the present invention it is proposed to also mount the rack on an axis at right angles to the indicator shaft, to permit of the movement of the rack at an angle to the teeth of the pinion under the influence of a thermostat controlled device which responds to temperature changes.

In that connection it is proposed to so design the rack that for the highest temperature under which the scale is intended to function, the rack will assume a vertical position, but at lower temperatures the rack will be caused to assume a relatively angular position thereby to compensate for the contraction of the wire of the springs and the increased stiffness of the springs due to a fall in temperature. A relatively rapid travel of the rack with reference to the pinion is required as the temperature drops from maximum and a progressively lesser movement for each corresponding drop in temperature because the rack is mounted so that it will swing through the arc of a circle with reference to the teeth of the indicator pinion, the rack will travel faster according to its angular position as determined by the thermostatically controlled means provided for that purpose.

It is apparent that the change in the rate of travel of the rack over the pinion as compared with the movement of the runner will not be in direct proportion to the movement of the rack at its vertical position. To obtain the desired result the rack must be moved from its vertical position by a cam or equivalent device, which for the first increment of movement of the cam will impart a relatively rapid tilting or angular movement to the rack and for each successive increment of cam movement a progressively lesser angular movement of the rack.

A preferred and practical embodiment of the invention is shown in the accompanying drawings in which:

Figure 1 is a vertical sectional view of a scale casing, showing the scale mechanism in elevation.

Fig. 2 is a vertical sectional view taken on the line 2—2 of Fig. 1.

Fig. 3 is an enlarged detail view of the cam mounting and the rack mounting.

Fig. 4 is a detail cross sectional view of the rack.

Similar reference characters designate corresponding parts throughout the several figures of the drawings.

Referring to the drawings which illustrate an example of the present invention, A designates the housing or casing for the scale mechanism which is carried by a suitable hanger B. The upper portion of the hanger B provides a support for the loading springs S which carry the runner C at their lower ends, the said runner projecting through the bottom of the casing in the usual manner to receive the pan or tray which supports the load to be weighed.

An indicator pinion 1 having a hub portion 2 is mounted on an indicator shaft 3 journaled in opposite portions of the hanger B, and the said pinion is adapted to engage with a rack R having a novel mounting on the carrier bar D which is adjustably mounted on the shank of the runner C. As will be seen from the drawing the lower end of the rack R has a compound hinge connection with the carrier bar D. That is to say, the rack proper is mounted on a hinge pintle 4 which is disposed at right angles to the axis of the indicator pinion 1, and the said pintle 4 is carried by a hinge leaf 5 which is in turn pivotally mounted on the carried bar D as at 6, the axis of the pivot 6 being parallel to the axis of the indicator pinion 1. The purpose of the pivot 6 is to provide the usual movement of the rack R to permit the same to be urged into constant engagement with the indicator pinion through the medium of a suitable spring 7, but the purpose of the hinge including the pintle 4 is to permit the rack to swing through an arc with respect to the teeth of the indicator pinion 1 to permit more rapid movement of the rack under lower temperature conditions. It may also be pointed out that the pintle 4 which provides the lateral hinge support for the rack is located at such a distance below the indicator pinion that the initial inclination of the rack under the influence of the thermostatically controlled means to be presently referred to, will initially correct the zero reading of the indicator. This initial correction will of course be carried through the remaining movement of the rack under varying load conditions, so that at all times the rack will accurately correct both for the zero reading and the changes in the stiffness of the springs due to temperature changes.

As previously indicated the movement of the rack R, except in the vertical position, with reference to the movement of the runner C, is not in direct proportion to the movement of the runner but has a progressively increasing rate of travel with reference to the pinion according to its increased angular position. As the inaccuracy in the scale reading is in direct proportion to the changes in temperature it is therefore necessary that means should be provided for imparting a progressively decreasing movement of the rack as the temperature drops and a progressively increasing movement as the temperature rises. The said means in the present instance is a cam 7' which bears against the rack at one side of and above the hinged axis 4. This cam is so designed that when moved under varying temperature conditions it will move the rack R through a greater or lesser arc according to the degree of temperature. The cam is so designed that when the temperature falls from the maximum and moves the rack from the vertical position its initial movement will cause the rack to swing through a greater initial arc than it will subsequently, and that each like subsequent drops in temperature will produce lesser and lesser deflections of the rack from the vertical position.

The cam 7ª is mounted on a suitable bracket 8 secured to the carrier bar D and is operated by the lever 9 which is pivotally mounted on the stud 10 also carried by the bracket 8. The upper end of the lever is forked to engage a stud on the cam with a suitable sliding movement and the lower end of the lever is connected to the upper end of a thermostat T. The thermostat as well as the bracket 8 are both mounted on the carrier bar D so that when the said bar is adjusted to set the rack initially the entire thermostat controlled device will be moved with the rack. The bracket 8 also carries a relatively light spring 11 which bears against the side of the rack opposite the cam for the purpose of maintaining the rack in engagement with the periphery of the cam under all conditions of use. The spring 11 is so light that it will not substantially affect the movement of the thermostat.

The vertical dotted line position of the rack in Fig. 2 shows the position of the rack at the highest temperature under which the scale is designed to operate, and the full line position shows the relative mean or normal position of the rack under average temperature conditions.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. In a spring scale, the combination with an indicator pinion, of a rack having a variable angular disposition with reference to the teeth of the pinion, and means for so controlling the angular position of the rack that it will correct errors of the indicator due to changes in temperature.

2. In a spring scale, the combination with an indicator pinion, of a rack having its longitudinal axis arranged at an angle to the teeth of the pinion, and means for changing the angular position of the rack to cause the same to correct errors of the indicator due to changes in temperature.

3. In a spring scale, the combination with an indicator pinion, of a rack hinged upon an axis at right angles to the axis of the pinion, and means for so swinging the rack across the teeth of the pinion to cause the same to correct errors of the indicator due to changes in temperature.

4. In a spring scale, the combination with an indicator pinion, of a rack hinged upon an axis at right angles to the axis of the pinion, and a thermostatically operated cam for changing the angular relation of the rack to the teeth of the pinion and cause the rack to correct errors of the indicator due to changes in temperature.

5. In a spring scale, the combination with an indicator pinion, of a rack hinged upon an axis at right angles to the axis of the pinion, a cam, thermostat means for actuating said cam, and the latter having its periphery formed to engage and move the rack at such variant angles to the teeth of the pinion as will cause the rack to correct errors of the indicator due to changes in temperature.

6. In a spring scale, the combination with an indicator pinion, of a rack hinged upon an axis at right angles to the axis of the pinion, a cam, thermostat means for actuating said cam, and the latter having its periphery formed to engage and move the rack at such variant angles to the teeth of the pinion as will cause the rack to correct errors of the indicator due to changes in temperature, and resilient means for maintaining the rack in constant engagement with the periphery of the cam.

7. In a spring scale, the combination with an indicator pinion and a runner supported by the springs of the scale, of a rack, an adjustable carrier bar mounted on the runner, means for pivotally connecting the rack to the carrier bar on an axis parallel with the axis of the pinion, a hinge for connecting the rack with said last named means, said hinge having its axis located at right angles to the axis of the pinion, and a thermostatically controlled cam engaging the rack and adapted to so change the angular relation thereof to the teeth of the pinion as to cause the same to correct errors of the indicator due to changes in temperature.

8. In a spring scale, the combination with an indicator pinion and a runner supported by the springs of the scale, a carrier bar mounted on the runner, a rack having a compound hinge connection with the carrier bar whereby the rack may move radial to the axis of the pinion and in an arc tangential to the teeth of the pinion, a cam mounted on the carrier bar and engaging with the rack, a spring for holding the rack in engagement with the periphery of the cam, a thermostat operatively connected with the cam, said cam, rack and thermostat all being mounted on the carrier bar.

9. In a spring scale, the combination with an indicator pinion, of a rack, and means for mounting the rack for engagement with the pinion including a pair of hinges respectively having their axes parallel with and at right angles to the axis of the indicator pinion, and thermostatic means for controlling the angular position of the rack with reference to the teeth of the pinion. .

New York city, N. Y., May 20th, 1929.
HENRY M. BRIGHAM.